(12) United States Patent
Park et al.

(10) Patent No.: US 9,584,215 B2
(45) Date of Patent: Feb. 28, 2017

(54) RELAY NODE AND METHOD FOR RECEIVING A SIGNAL FROM A BASE STATION IN A MOBILE COMMUNICATION SYSTEM

(75) Inventors: Kyu Jin Park, Anyang-si (KR); Sungho Moon, Anyang-si (KR); Yeong Hyeon Kwon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1053 days.

(21) Appl. No.: 13/319,032

(22) PCT Filed: May 7, 2010

(86) PCT No.: PCT/KR2010/002903
§ 371 (c)(1),
(2), (4) Date: Nov. 4, 2011

(87) PCT Pub. No.: WO2010/128816
PCT Pub. Date: Nov. 11, 2010

(65) Prior Publication Data
US 2012/0063386 A1    Mar. 15, 2012

Related U.S. Application Data

(60) Provisional application No. 61/176,491, filed on May 8, 2009.

(30) Foreign Application Priority Data

May 7, 2010    (KR) .................. 10-2010-0042766

(51) Int. Cl.
*H04B 7/14*    (2006.01)
*H04W 40/00*    (2009.01)
(Continued)

(52) U.S. Cl.
CPC ........... *H04B 7/2606* (2013.01); *H04B 7/155* (2013.01); *H04L 5/0053* (2013.01); *H04L 27/2602* (2013.01); *H04W 56/00* (2013.01)

(58) Field of Classification Search
CPC ......... H04J 11/00; H04B 7/14; H04B 7/2606; H04B 7/155; H04W 4/00; H04W 40/00;
(Continued)

(56) References Cited

U.S. PATENT DOCUMENTS 8,582,419 B2 * 11/2013 Seo ................. H04B 7/2606
370/208
2007/0281613 A1    12/2007 Lee et al.
(Continued)

FOREIGN PATENT DOCUMENTS

KR    10-2007-0062635 A    6/2007
KR    1020070119914 A    12/2007
WO    2009/017365 A1    2/2009

OTHER PUBLICATIONS

3rd Generation Partnership Project; Technical Specification—Group Radio Access Network; Further Advancements for E-UTRA, Physical Layer Aspects (Release 9), Feb. 2009, 3GPP TR36.814 V0.4.1 (Feb. 2009).*

(Continued)

*Primary Examiner* — Chi H Pham
*Assistant Examiner* — Shailendra Kumar
(74) *Attorney, Agent, or Firm* — Dentons US LLP

(57) ABSTRACT

Provided are a method for receiving information on a relay node zone and reference signals for a relay node from a base station, and a relay node device using same. The relay node can receive information on at least one start point from the start points of a Relay-Physical Downlink Control Channel (R-PDCCH) and a Relay-Physical Downlink Shared Channel (R-PDSCH) for transmitting a signal from a base station
(Continued)

to a relay node in a specific downlink subframe. Alternatively, the relay node can implicitly recognize the start points of the R-PDCCH and R-PDSCH set in advance. The relay node can recognize a signal from the base station in the specific downlink subframe based on the start point information after the time corresponding to at least one of the start points of the R-PDCCH and R-PDSCH. Also, the relay node can decode signals transmitted from a base station after the corresponding timing.

6 Claims, 13 Drawing Sheets

(51) Int. Cl.
H04W 92/00 (2009.01)
H04B 7/26 (2006.01)
H04B 7/155 (2006.01)
H04L 5/00 (2006.01)
H04L 27/26 (2006.01)
H04W 56/00 (2009.01)

(58) Field of Classification Search
CPC ........ H04W 92/00; H04W 56/00; H04Q 7/20; H04L 27/06; H04L 27/28; H04L 5/0053; H04L 27/2602
USPC ......................................... 370/315, 338, 208
See application file for complete search history.

(56) References Cited

U.S. PATENT DOCUMENTS

| 2008/0070582 A1* | 3/2008 | Cai | H04B 7/15542 |
| | | | 455/450 |
| 2008/0227386 A1 | 9/2008 | Dayal et al. | |
| 2011/0286423 A1* | 11/2011 | Berggren | H04L 5/001 |
| | | | 370/329 |
| 2012/0106374 A1* | 5/2012 | Gaal | H04L 5/0048 |
| | | | 370/252 |

OTHER PUBLICATIONS

Research in Motion, UK Limited, Relay Link Control Signalling, 3GPP TSG RAN WG1 Meeting #56bis, Seoul, Korea, Mar. 23-27, 2009, R1-091151.*
LG Electronics, Resource Allocation and Downlink Control Channel Structure for Relay Backhaul Link, 3GPP TSG RAN WG1 Meeting #56bis, Seoul, Korea, Mar. 23-27, 2009, R1-091194.*
Nortel, Control Channel and Data Channel Design for Relay Link in LTE-Advanced 3GPP TSG RAN Working Group 1 Meeting #56, Athens, Greece, Feb. 9-13, 2009, R1-090753.*
Research in Motion, UK Limited: "Relay Link Control Signaling", 3GPP TSG RAN WG1 #56bis, Seoul, Korea, Mar. 23-27, 2009, R1-091151.
LG Electronics: "Resource Allocation and Downlink Control Channel Structure for Relay Backhaul Link", 3GPP TSG RAN WG1 #56bis, Seoul, Korea, Mar. 23-27, 2009, R1-091194.

* cited by examiner

RELAY NODE AND METHOD FOR RECEIVING A SIGNAL FROM A BASE STATION IN A MOBILE COMMUNICATION SYSTEM

This application is a 35 U.S.C. §371 National Stage entry of International Application No. PCT/KR2010/002903, filed on May 7, 2010, and claims the benefit of U.S. Provisional Application No. 61/176,491, filed May 8, 2009, and Korean Patent Application No. 10-2010-0042766, filed May 7, 2010, each of which are hereby incorporated by reference in their entireties as if fully set forth herein.

FIELD OF THE INVENTION

The present invention relates to a mobile communication system, and more particularly to a method for allowing a relay node (RN) to receive a signal using information of a relay node (RN) zone allocated for downlink (DL) transmission from an eNode B to the RN, and a method for allowing the eNode B to allocate a reference signal (RS) for the RN.

BACKGROUND ART

If a channel condition between an eNode B and the UE is poor, a relay node (RN) is installed between the BS and the UE such that it can provide an RF channel having superior channel conditions to the UE. In addition, a relay node (RN) is introduced to a cell edge region having a poor channel condition such that it can provide a higher-speed data channel and can extend a cell service region. As described above, the relay node (RN) has been widely used to solve the propagation shade region in a wireless communication system.

Compared to the conventional relay node (RN) art that is restricted to functions of a repeater capable of amplifying/transmitting a signal, the latest technology is being developed to cover more intelligent techniques. Furthermore, the relay node (RN) technology can reduce costs associated with increasing the number of eNode Bs and maintenance costs of a backhaul network in next generation mobile communication systems, and is requisite for extending the service coverage simultaneously while increasing the data processing rate. With the increasing development of relay node (RN) technology, the necessity for the relay node (RN) used in the conventional wireless communication system to be supported by the new wireless communication system is also increasing.

As the technology for forwarding a link connection between the eNode B and the UE is introduced to a relay node (RN) in a 3$^{rd}$ Generation Partnership Project Long Term Evolution-Advanced (3GPP LTE-A) system, two links having different attributes are applied to a UL carrier frequency band and a DL carrier frequency band. The connection link between the eNode B and the RN is defined as a backhaul link. Transmission of data using downlink (DL) resources according to a Frequency Division Duplexing (FDD) or Time Division Duplexing (TDD) scheme is referred to as backhaul downlink. Transmission of data using uplink (UL) resources according to the FDD or TDD scheme is referred to as backhaul uplink.

FIG. 1 is a conceptual diagram illustrating a relay backhaul link and a relay access link for use in a wireless communication system.

Referring to FIG. 1, the RN may receive information from the eNode B through a relay backhaul downlink, and may transmit information to the eNode B through a relay backhaul uplink. In addition, the relay node may transmit information to the UE through the relay access downlink, or may receive information from the UE through the relay access uplink.

Although the LTE-A system evolved from the LTE system acting as a mobile communication system supports the RN, the RN is not aware of a specific time at which the RN receives control information and data from the eNode B. As a result, the reception efficiency of a signal transmitted from the eNode B to the RN is unavoidably deteriorated.

In order to enable the LTE-A system to support the RN, a method for allocating a reference signal (RS) in a zone allocated for the RN and a method for allocating a control channel for the RN have not been investigated yet. In order to implement efficient signal transmission/reception of the RN, there are needed a method for allocating a reference signal (RS) in an RN zone and a method for allocating a control channel for the RN.

DETAILED DESCRIPTION OF THE INVENTION

Technical Problem

An object of the present invention is to provide a method for receiving a signal of a relay node (RN).

Another object of the present invention is to provide a relay node (RN) apparatus for receiving a signal from an eNode B.

It is to be understood that technical objects to be achieved by the present invention are not limited to the aforementioned technical objects and other technical objects which are, not mentioned herein will be apparent from the following description to one of ordinary skill in the art to which the present invention pertains.

Technical Solution

The object of the present invention can be achieved by providing a method for receiving a signal at a relay node (RN) in a mobile communication system including receiving information on at least one of start points of a relay-physical downlink control channel (R-PDCCH) and a relay-physical downlink shared channel (R-PDSCH) that are used to transmit a signal from an eNode B to the relay node at a specific downlink subframe; receiving a signal from the eNode B at the specific downlink subframe based on the received start point information since a specific time corresponding to at least one of the R-PDCH and R-PDSCH start points; and decoding the received signal.

At least one of the R-PDCCH and R-PDSCH start points may be represented by an OFDM symbol level.

At least one of the R-PDCCH start point and the R-PDSCH start point may be a fourth OFDM symbol in time order among a plurality of OFDM symbols of the specific subframe.

At least one of the R-PDCCH start point and the R-PDSCH start point may be dynamically allocated to each subframe. At least one of the R-PDCCH start point and the R-PDSCH start point may be equally allocated to each RN belonging to the same cell.

The specific subframe may be a fake-Multicast Broadcast Single Frequency Networking (fake-MBSFN) subframe.

In another aspect of the present invention, a relay node (RN) apparatus for receiving a signal in a mobile communication system includes a radio frequency (RF) unit configured to receive at least one of start points of a relay-physical downlink control channel (R-PDCCH) and relay-physical downlink shared channel (R-PDSCH) that are used to transmit a signal from an eNode B to the relay node at a specific downlink subframe, and receive a signal from the eNode B at the specific downlink subframe based on the received start point information since a specific time corresponding to at least one of the R-PDCH and R-PDSCH start points; and a processor configured to decode the received signal.

At least one of the R-PDCCH and R-PDSCH start points may be represented by an OFDM symbol level.

At least one of the R-PDCCH and R-PDSCH start points received at the RF unit may be a fourth OFDM symbol in time order among a plurality of OFDM symbols of the specific subframe.

At least one of the R-PDCCH start point and the R-PDSCH start point may be dynamically allocated to each subframe. At least one of the R-PDCCH start point and the R-PDSCH start point may be equally allocated to each RN belonging to the same cell.

The specific subframe may be a fake-Multicast Broadcast Single Frequency Networking (fake-MBSFN) subframe.

Effects of the Invention

As apparent from the above description, exemplary embodiments of the present invention have the following effects. The relay node (RN) can efficiently decode a Relay-Physical Downlink Control Channel (R-PDCCH) start point and a Relay-Physical Downlink Shared Channel (R-PSDCH) start point using information regarding a RN zone in which an eNode B transmits control information, data, etc. for the relay node (RN).

According to the embodiments of the present invention, an eNode B allocates a reference signal (RS) according to an RS allocation method for channel estimation and/or demodulation of a relay node (RN), such that the Rn can correctly estimate a downlink (DL) channel state from the eNode B and at the same time can efficiently receive DL data from the eNode B.

It will be appreciated by persons skilled in the art that that the effects that can be achieved with the present invention are not' limited to what has been particularly described hereinabove and other advantages of the present invention will be more clearly understood from the following detailed description taken in conjunction with the accompanying drawings.

Effects of the Invention

As apparent from the above description, exemplary embodiments of the present invention have the following effects. The relay node (RN) can efficiently decode a Relay-Physical Downlink Control Channel (R-PDCCH) start point and a Relay-Physical Downlink Shared Channel (R-PSDCH) start point using information regarding a RN zone in which an eNode B transmits control information, data, etc. for the relay node (RN).

According to the embodiments of the present invention, an eNode B allocates a reference signal (RS) according to an RS allocation method for channel estimation and/or demodulation of a relay node (RN), such that the Rn can correctly estimate a downlink (DL) channel state from the eNode B and at the same time can efficiently receive DL data from the eNode B.

It will be appreciated by persons skilled in the art that that the effects that can be achieved with the present invention are not' limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a user equipment (UE) may refer to a mobile terminal, fixed mobile terminal, a mobile station (MS) and the like. Also, the eNode B (eNB) may refer to an arbitrary node of a network end which communicates with the above terminal, and may include a base station (BS), a Node B (Node-B), and an access point (AP) and the like.

In a mobile communication system, the UE may receive information from the eNode B via a downlink, and may transmit information via an uplink. The information that is transmitted and received to and from the UE includes data and a variety of control information. There are a variety of physical channels according to categories of transmission (Tx) and reception (Rx) information of the UE.

Figure 1:
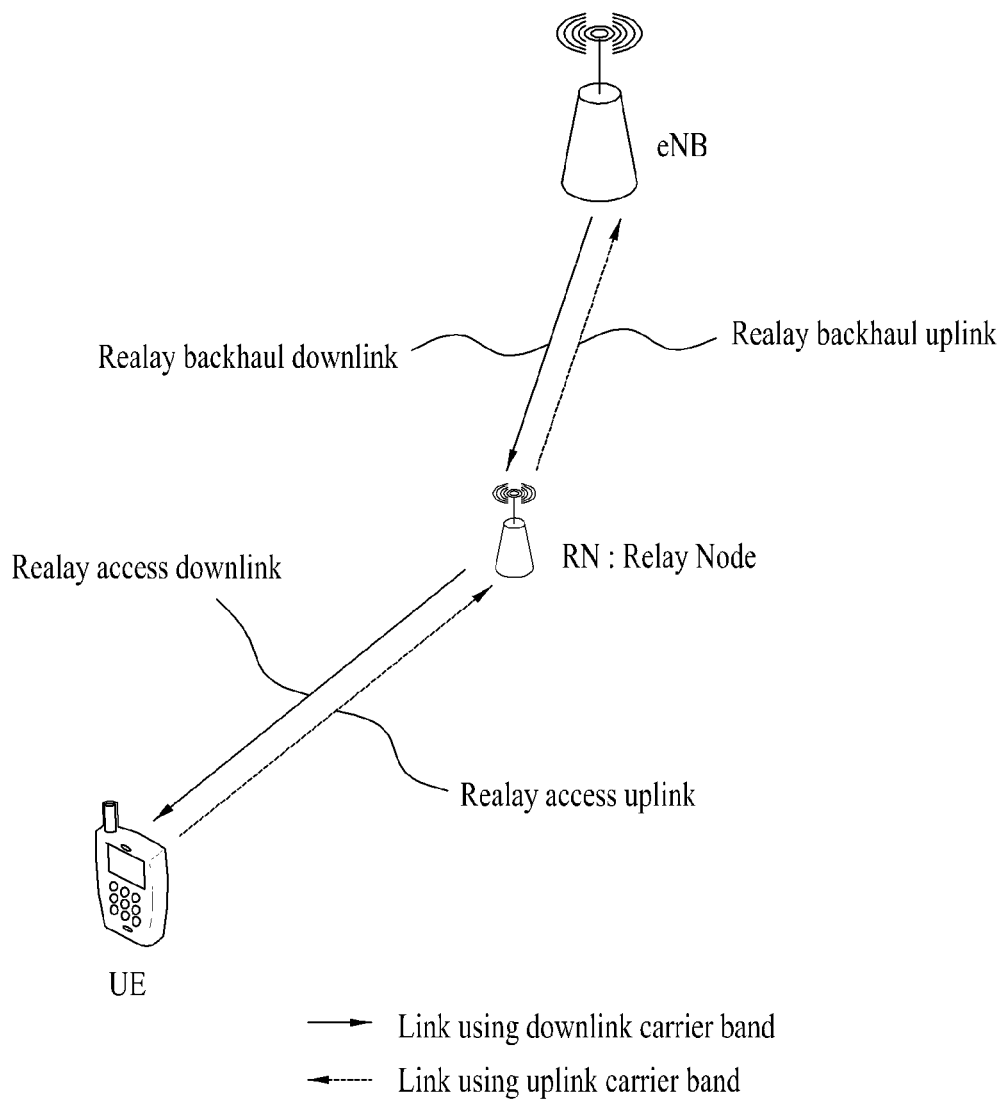
FIG. 1 is a conceptual diagram illustrating a relay backhaul link and a relay access link for use in a wireless communication system.
Figure 2:
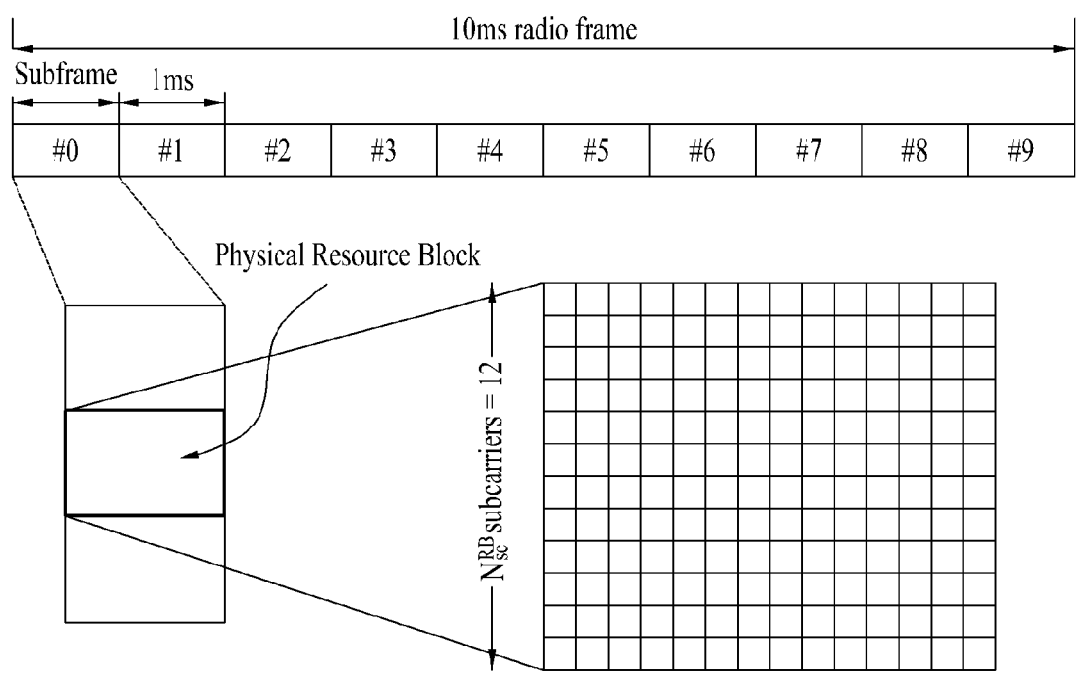
FIG. 2 is an exemplary structural diagram illustrating a frame for use in a 3GPP LTE system acting as an exemplary mobile communication system according to an embodiment of the present invention.

FIG. 2 is an exemplary structural diagram illustrating a frame for use in a 3GPP LTE system acting as an exemplary mobile communication system according to an embodiment of the present invention.

Referring to FIG. 2, one radio frame includes 10 subframes, and one subframe includes two slots in a time domain. A time required for transmitting one subframe is defined as a Transmission Time Interval (TTI). For example, one subframe may have a length of 1 ms and one slot may have a length of 0.5 ms. One slot may include a plurality of Orthogonal Frequency Division Multiplexing (OFDM) symbols or a Single Carrier Frequency Division Multiple Access (SC-FDMA) symbols in a time domain.

Figure 3:
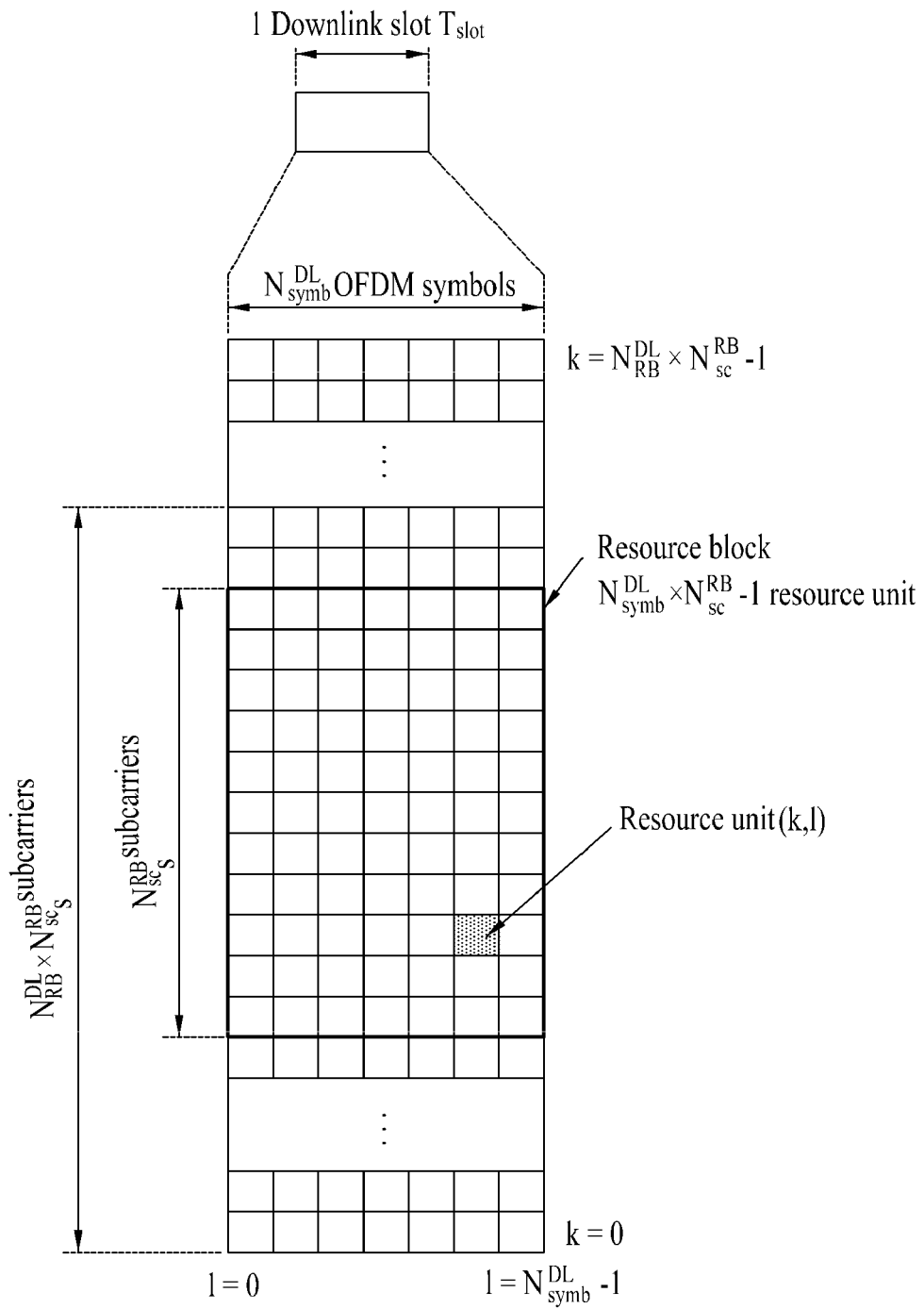
FIG. 3 shows a downlink (DL) time-frequency resource grid structure for use in a 3GPP LTE system acting as an exemplary mobile communication system according to an embodiment of the present invention.

FIG. 3 shows a downlink (DL) time-frequency resource grid structure for use in a 3GPP LTE system acting as an exemplary mobile communication system according to an embodiment of the present invention.

Referring to FIG. 3, the 3GPP LTE system is configured to use the OFDMA scheme in downlink. A resource block (RB) is a resource allocation unit. 10 subframes may be contained in one radio frame, 2 slots may be contained in one subframe, and 7 OFDM symbols may be contained in one slot. However, the scope or spirit of the present invention is not limited thereto and the number of subframes, the number of slots, and the number of OFDM symbols may also be changed in various ways. For convenience of description and better understanding of the present invention, the following description assumes that the number of OFDM symbols contained in one subframe is set to 14.

Referring to FIG. 3, downlink transmission resources can be described by a resource grid including $N_{RB}^{DL} \times N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. $N_{RB}^{DL}$ RB varies with a downlink transmission bandwidth constructed in a cell, and must satisfy $N_{RB}^{min,DL} \leq N_{RB}^{DL} \leq N_{RB}^{max,DL}$. Here, $N_{RB}^{min,DL}$ is the smallest downlink bandwidth supported by the wireless communication system, and $N_{RB}^{max,DL}$ is the largest downlink bandwidth supported by the wireless communication system. Although $N_{RB}^{min,DL}$ may be set to 6 ($N_{RB}^{min,DL}=6$) and $N_{RB}^{max,DL}$ may be set to 110 ($N_{RB}^{max,DL}=110$), the scopes of $N_{RB}^{min,UL}$ and $N_{RB}^{max,UL}$ are not limited thereto. The number of OFDM symbols contained in one slot may be differently defined according to the length of a Cyclic Prefix (CP) and spacing between subcarriers. When transmitting data or information via multiple antennas, one resource grid may be defined for each antenna port.

Each element contained in the resource grid for each antenna port is called a resource element (RE), and can be identified by an index pair (k,l) contained in a slot, where k is an index in a frequency domain and is set to any one of $0, \ldots, N_{RB}^{DL} N_{SC}^{RB}-1$, and l is an index in a time domain and is set to any one of $0, \ldots, N_{symb}^{DL}-1$.

Resource blocks (RBs) shown in FIG. 3 are used to describe a mapping relationship between certain physical channels and resource elements (REs). The RBs can be classified into physical resource blocks (PRBs) and virtual resource blocks (VRBs).

One PRB is defined by $N_{symb}^{DL}$ consecutive OFDM symbols in a time domain and $N_{SC}^{RB}$ consecutive subcarriers in a frequency domain. $N_{symb}^{DL}$ and $N_{SC}^{RB}$ may be predetermined values, respectively. For example, $N_{symb}^{DL}$ and $N_{SC}^{RB}$ may be given as shown in the following Table 1. Therefore, one PRB may be composed of $N_{symb}^{DL} \times N_{SC}^{RB}$ resource elements. One PRB may correspond to one slot in a time domain and may also correspond to 180 kHz in a frequency domain, but it should be noted that the scope of the present invention is not limited thereto.

TABLE 1

| Configuration | | $N_{SC}^{RB}$ | $N_{symb}^{DL}$ |
|---|---|---|---|
| Normal Cyclic Prefix | $\Delta f = 15$ kHz | 12 | 7 |
| Extended Cyclic Prefix | $\Delta f = 15$ kHz | | 6 |
| | $\Delta f = 7.5$ kHz | 24 | 3 |

The PRBs are assigned numbers from 0 to $N_{RB}^{DL}-1$ in the frequency domain. A PRB number $n_{PRB}$ and a resource element index (k,l) in a slot can satisfy a predetermined relationship denoted by $$n_{PRB} = \left\lfloor \frac{k}{N_{sc}^{RB}} \right\rfloor.$$

The VRB may have the same size as that of the PRB. The VRB may be classified into a localized VRB (LVRB) and a distributed VRB (DVRB). For each VRB type, a pair of PRBs allocated over two slots of one subframe is assigned a single VRB number $n_{VRB}$.

The VRB may have the same size as that of the PRB. Two types of VRBs are defined, the first one being a localized VRB (LVRB) and the second one being a distributed type (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

Figure 4:
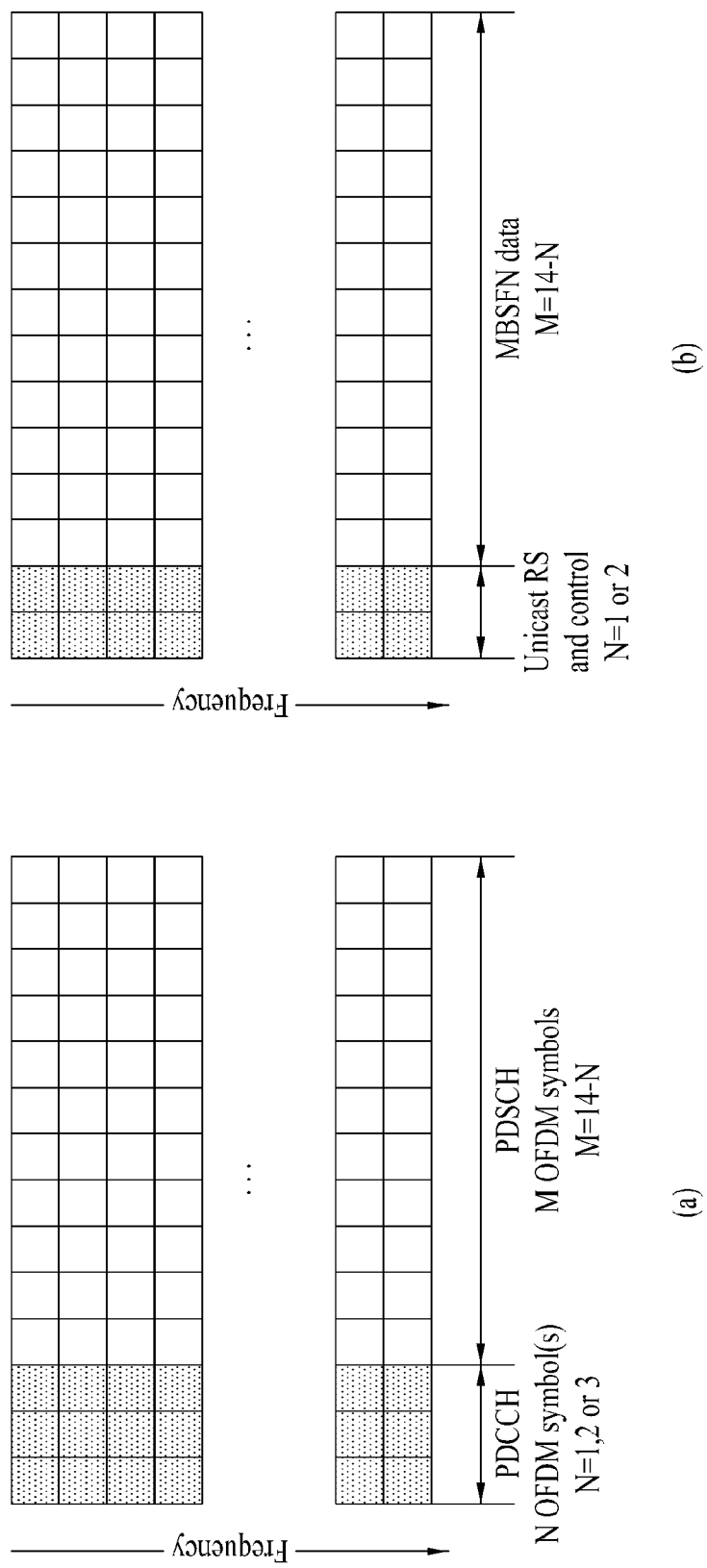
FIG. 4 exemplarily shows a normal subframe structure and a multimedia broadcast multicast service single frequency network (MBSFN) subframe structure for use in a 3GPP LTE system acting as an exemplary mobile communication system according to an embodiment of the present invention.

FIG. 4 exemplarily shows a normal subframe structure and a multimedia broadcast multicast service single frequency network (MBSFN) subframe structure for use in a 3GPP LTE system acting as an exemplary mobile communication system according to an embodiment of the present invention.

Referring to the normal subframe of FIG. 4(a), an eNode B may transmit control information over a physical downlink control channel (PDCCH) composed of 1, 2, or 3 OFDM symbols in a single subframe. Therefore, the eNode B may transmit data and/or control information over a physical downlink shared channel (PDSCH) composed of the remaining 11, 12, or 13 OFDM symbols of the single subframe.

In contrast, referring to the MBSFN subframe of FIG. 4(b), the eNode B may transmit a unicast reference signal RS) and a control signal using one or two OFDM symbols of one subframe, and may transmit MBSFN data using the remaining 12 or 13 OFDM symbols.

In the following description, a specific zone in which a donor eNB transmits a control channel (R-PDCCH) for the RN and transmits a data channel (R-PDSCH) for the RN in a downlink subframe is defined as a relay zone (or relay region). That is, the relay zone is used for downlink backhaul transmission.

Figure 5:
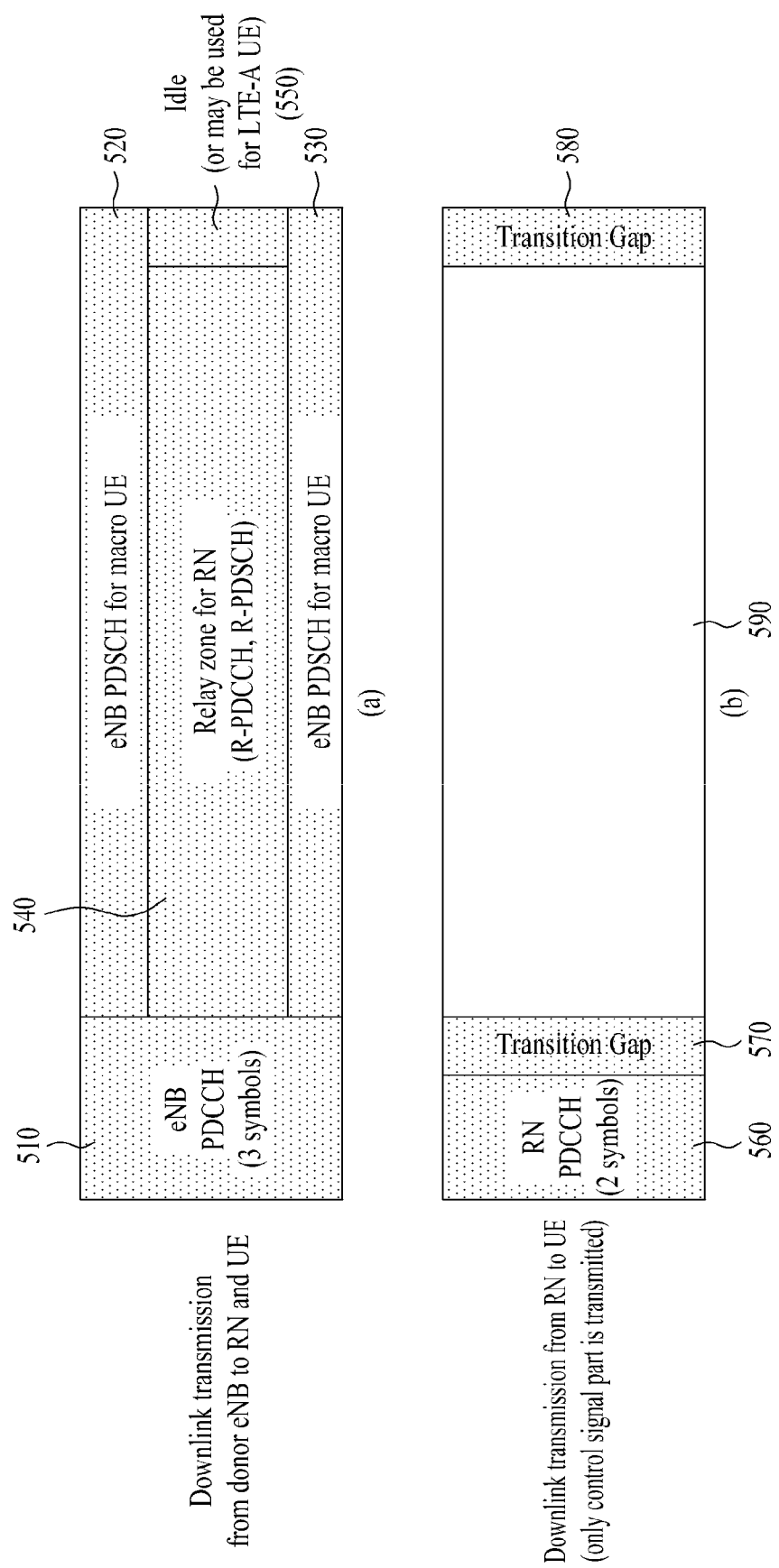
FIG. 5 exemplarily shows a backhaul subframe structure of a donor eNode B (DeNB) and a backhaul subframe structure of a relay node (RN) for use in a 3GPP LTE system acting as an exemplary mobile communication system according to an embodiment of the present invention.

FIG. 5 exemplarily shows a backhaul subframe structure of a donor eNB and a backhaul subframe structure of a relay node for use in a 3GPP LTE system acting as an exemplary mobile communication system according to an embodiment of the present invention.

As described above, one subframe may include 14 OFDM symbols. The donor-eNB downlink backhaul subframe structure shown in FIG. 5(a) and the RN backhaul subframe structure shown in FIG. 5(b) are timing-aligned examples.

Referring to FIG. 5(a), the donor eNB may transmit control information and the like to UEs and RNs on a PDCCH 510 consist of a predetermined number of symbols (e.g., 3 symbols). The donor eNB may transmit data and/or control information to macro UEs through some regions 520 and 530 from among a PDSCH zone. In addition, the donor eNB may transmit control information and/or data to the RN through a zone for the RN (i.e., a relay zone) 540. R-PDCCH acting as a control channel for the RN and R-PDSCH acting as a data channel for the RN may be assigned to the relay zone 540. An idle zone or an LTE-A UE zone 550 may be located next to the relay zone 540. Provided that the RN downlink subframe shown in FIG. 5(b) is time-shifted as compared to the donor-eNB downlink subframe shown in FIG. 5(a) (for example, the RN downlink subframe of FIG. 5(a) is more delayed than the donor-eNB downlink subframe of FIG. 5(a) by a predetermined time corresponding to 0.5 symbol), the idle zone or the LTE-A UE zone 550 may not be assigned.

In the donor-eNB downlink backhaul subframe, the relay zone 540 may include an R-PDCCH zone and an R-PDCCH zone (or region). Therefore, in order to receive backhaul signal from the donor eNB, there is a need for the RN to recognize a start point of the R-PDCCH zone and/or a start point of the R-PDSCH zone. In the relay zone 540, R-PDCCH and R-PDSCH may be assigned by frequency division multiplexing (FDM) or time division multiplexing (TDM) multiplexed.

Referring to FIG. 5(b), the RN may transmit control information or the like to the UE over a PDCCH 560 consist of a predetermined number of symbols (e.g., one or two symbols). The RN backhaul subframe shown in FIG. 5(b) may be set to a fake-MBSFN subframe for backhaul reception from the donor eNB. In order to switch the RN from a transmission mode to a reception mode, a switching zone is needed. Therefore, a transition gap 570 may be assigned next to the PDCCH zone 560 corresponding to a transmission zone. In other words, the transition gap 570 may be used as a switching zone. In this case, one OFDM symbol may be assigned to the transition gap 570. A relay zone 590 in which the RN can receive data, control information, etc. from the donor eNB may be assigned subsequent to the transition gap 570. A transition gap 580 may be assigned subsequent to the relay zone 590.

The RN has to recognize the R-PDCCH and R-PDSCH start points. The R-PDCCH and R-PDSCH start points may be determined by the size of the RN PDCCH 560 (e.g., the number of OFDM symbols). For example, it is assumed that the RN uses two OFDM symbols as a PDCCH zone 560 for UEs. As can be seen from FIG. 5(b), the donor eNB may set the R-PDCCH start point and/or the R-PDSCH start point to a fourth OFDM symbol. However, if the size of the RN PDCCH zone 560 is set to one OFDM symbol, a third OFDM symbol subsequent to the transition gap 570 occupying one OFDM symbol may be the R-PDCCH and/or R-PDSCH start point(s). In other words, the R-PDCCH and/or R-PDSCH start point(s) may be changed according to the number of OFDM symbols corresponding to the PDCCH zone 560 in which the RN can transmit a control signal or the like to a lower UE.

Therefore, irrespective of the number of OFDM symbols (e.g., one or two OFDM symbols) corresponding to the PDCCH zone 560 in which the RN transmits a control signal or the like to a lower UE, each of the R-PDCCH and R-PDCCH start points may be fixed to a fourth OFDM symbol, Information regarding the R-PDCCH and R-PDSCH start points, each of which is fixed to the fourth OFDM symbol, may be signaled from the donor eNB to the RN. Alternatively, each of the R-PDCCH and R-PDSCH start points may be previously fixed to the fourth OFDM symbol, such that the RN may implicitly recognize the resultant R-PDCCH and R-PDSCH start points. In this case, the donor eNB need not transmit signaling information to the RN.

Information regarding the R-PDCCH and R-PDCCH start points of the donor eNB may be transmitted to the RN. Upon receiving the R-PDCCH and R-PDCCH start point information from the donor eNB, the RN may effectively receive data, control information, etc. from the donor eNB in response to the relay zone 590 (R-PDCCH and R-PDCCH) timing point. The relay zone 590 start point information may indicate the R-PDCCH start point and the R-PDSCH start point.

The above-mentioned relay zone allocation may be cell-specifically or RN-specifically achieved. That is, the donor eNB may cell-specifically (equally to each RN contained in the same cell) allocate the relay zone. In addition, the donor eNB may dynamically assign the relay zone. For example, relay zone allocation may be changed per downlink backhaul subframe. In contrast, the relay zone allocation may be semi-persistently achieved.

A Reference Signal (RS) allocation method and a R-PDCCH construction method for use in the relay zone will hereinafter be described in detail. First, an RS for use in the LTE system and LTE-A system will be given below.

The RS for use in the LTE system may be classified into a dedicated reference signal (DRS) and a common reference signal (CRS). The DRS may be UE-specifically used. Generally, the DRS may be used to demodulate data or the like. The DRS may be classified into a precoded RS and a non-precoded RS. The CRS may be used for demodulation and channel estimation. All UEs belonging to one cell may share the CRS.

Figure 6:
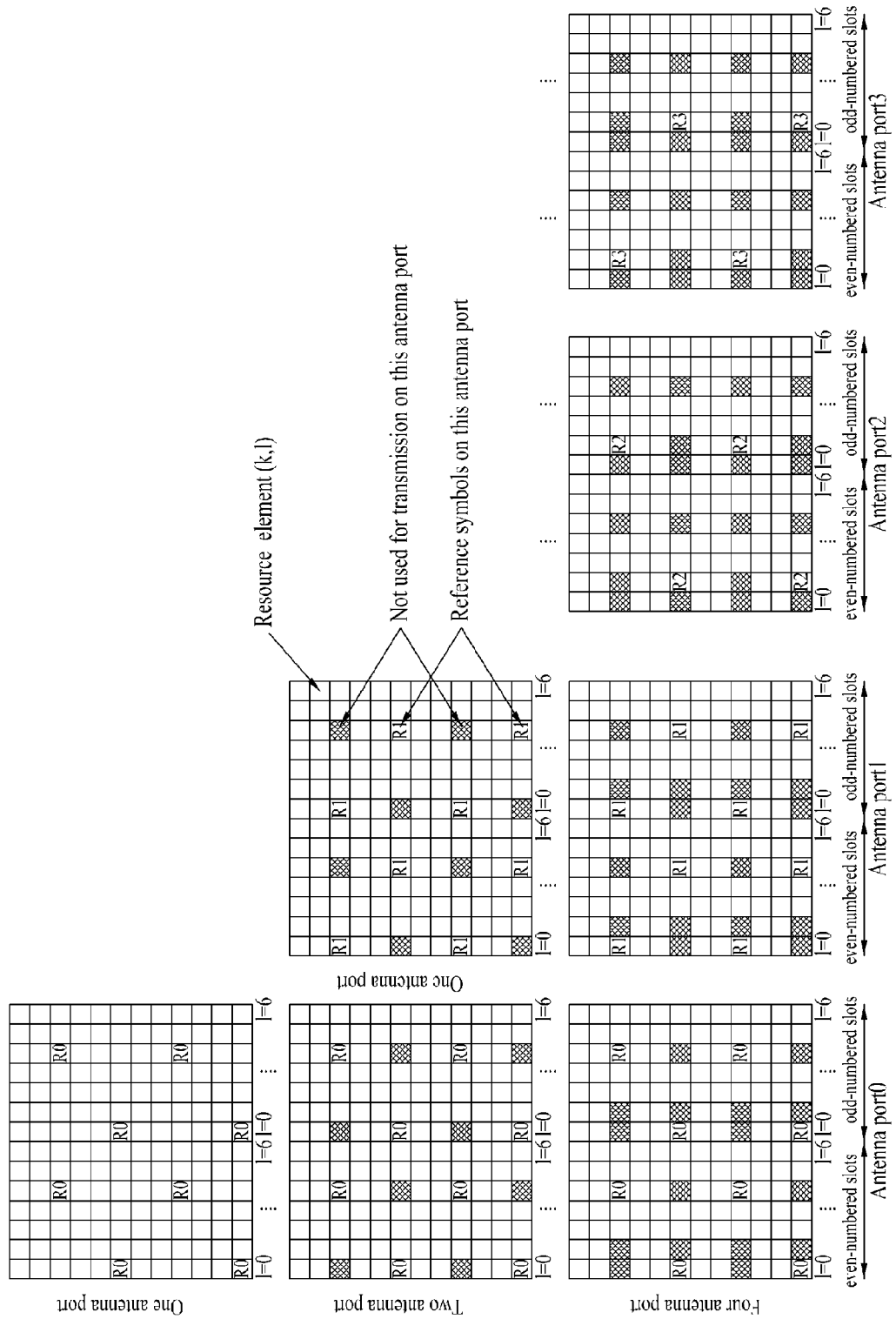
FIG. 6 is a structural diagram illustrating a common reference signal (CRS) structure depending on an antenna port for use in a 3GPP LTE system acting as an exemplary mobile communication system according to an embodiment of the present invention.

FIG. 6 is a structural diagram illustrating a CRS structure depending on an antenna port for use in a 3GPP LTE system acting as an exemplary mobile communication system according to an embodiment of the present invention.

Referring to FIG. 6, CRS patterns of individual antennas may be orthogonal to each other in a time or frequency domain. Provided that the LTE system includes one antenna port, CRS may be used as a pattern of the antenna port 0. In addition, provided that 4Tx MIMO transmission is applied to the LTE system, patterns of the antenna ports 0 to 3 may be simultaneously used as the CRS pattern. In this case, R0 may indicate a CRS of the antenna port 0. In order to minimize interference between RSs, other RSs may not be transmitted in the same resource element (RE) for CRS transmission. In addition, a predefined sequence (for example, pseudo-random (PN), etc.) may be multiplexed with a downlink RS so as to minimize the inter-cell interference. As a result, channel estimation throughput may be improved. The PN sequence may be used as an OFDM symbol level in one subframe. In this case, the PN sequence may be defined according to a cell ID, a subframe number, and the location of an OFDM symbol.

For example, as shown in FIG. 6, the number of RSs in one OFDM symbol that includes a reference signal (RS) in one RB for each antenna port is set to 2. The number of RBs for use in the LTE system is set to any one of 6 to 110. Accordingly, a total of RSs for each antenna port in one OFDM symbol having an RS is denoted by $2 \times N_{RB}$. In this case, $N_{RB}$ is the number of RBs corresponding to a bandwidth, and a sequence may be a binary or complex.

A sequence r(m) may be denoted by a complex sequence.

$$r(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, 2N_{RB}^{max} - 1$$

In Equation 1, $N_{RB}^{max}$ is the number of RBs corresponding to a maximum bandwidth of the LTE system. Therefore, $N_{RB}^{max}$ may be set to 110 as described above. C is a PN sequence having the length of 31, and may be defined as a Gold sequence. In this case, if a downlink RS is denoted by a DRS, Equation 1 may also be represented by the following Equation 2.

$$r(m) = \frac{1}{\sqrt{2}}(1 - 2 \cdot c(2m)) + j\frac{1}{\sqrt{2}}(1 - 2 \cdot c(2m+1)),$$ [Equation 2]

$$m = 0, 1, \ldots, 12N_{RB}^{PDSCH} - 1$$

In Equation 2, $N_{RB}^{PDSCH}$ is the number of RBs allocated to a specific UE. Therefore, the length of a sequence may be changed according to the number of RBs allocated to one UE.

In order to reduce overhead caused by RS transmission, DRS-based downlink transmission may be used in the LTE-A system. CRS-based downlink transmission always requires RS transmission for all physical antenna ports. The DRS-based downlink transmission can reduce RS overhead in consideration of a virtual antenna port requiring an RS. The number of virtual antenna ports may be identical or less than the number of physical antenna ports. DRS is used for demodulation purpose, such that other RSs may be used for channel measurement. Channel state indicator-reference signal (CSI-RS) may be transmitted according to a duty cycle. As a result, provided that the duty cycle is relatively long enough, the RS overhead may be minimized.

In addition to a common reference signal (CRS) defined in the legacy Release-8, new RS formats (i.e., DM-RS (Demodulation RS) and CSI-RS) have been introduced to the LTE-A system. DM-RS is an extended version of the Release-8 UE-specific RS concept for multiple layers. The DM-RS is UE-specifically transmitted, and is transmitted through a scheduled resource block (RB) and the corresponding layer. RSs of individual layers are orthogonal to each other.

Figure 7:
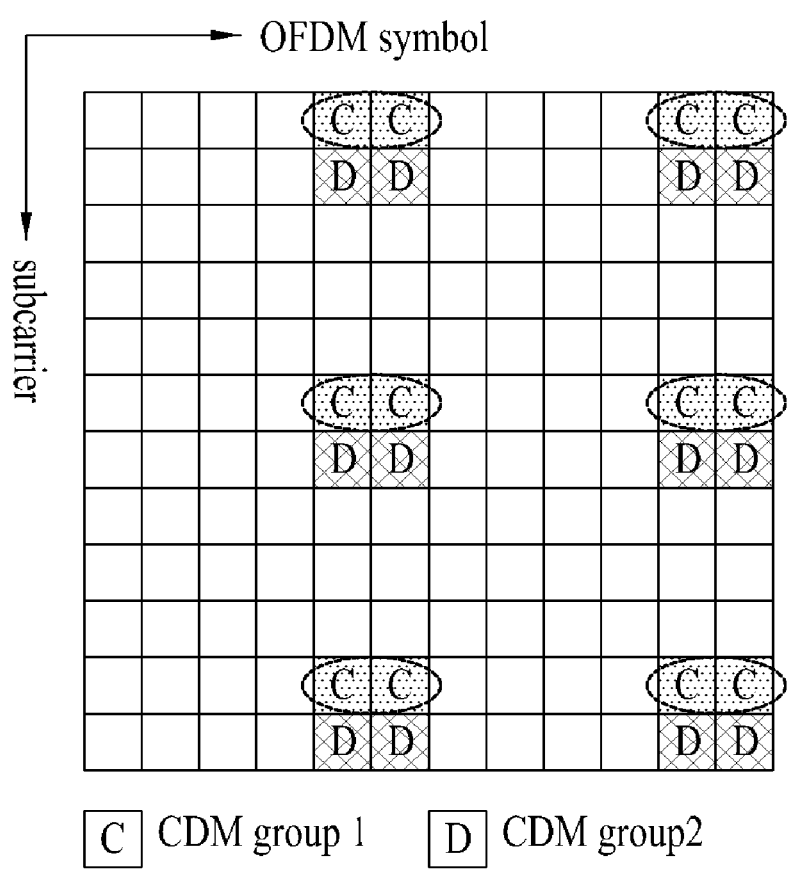
FIG. 7 exemplarily shows a DRS pattern contained in a single physical resource block (PRB) of a specific subframe.

FIG. 7 exemplarily shows a DRS pattern contained in a single physical resource block (PRB) of a specific subframe.

Referring to FIG. 7, the DRS pattern may support a maximum of 4 layers. Two code division multiplexing (CDM) groups are used to multiplex two layers in each CDM group, and four layers may be maximally multiplexed using the above-mentioned pattern. For CDM multiplexing, 2×2 Walsh spreading or 4×4 Walsh spreading may be used.

In order to feed back channel status information (CSI) to the donor eNB, there is a need for CSI-RS to be transmitted along with a DRS. The UE and the RN can estimate a downlink channel status using the received CSI-RS. CSI-RS may be transmitted in response to a duty cycle (e.g., 5 ms). In this case, the duty cycle is set to 5 ms or less.

The donor eNB may transmit the CSI-RS at intervals of a predetermined time so as to estimate a downlink channel state of the RN. In this case, CSI-RS may be transmitted in the form of a specific pattern at a subframe of the corresponding period.

Embodiments in which the donor eNB transmits an RS for channel status measurement and demodulation to the RN using a specific pattern will hereinafter be described in detail.

In a downlink backhaul subframe, if the donor eNB transmits at least 4Tx antenna transmission scheme (i.e., if the donor eNB supports 5 to 8 Tx antennas), there is needed an RS (reference symbol) for enabling the RN to perform channel status measurement and demodulation. In FIGS. 8 to 12, R0, R1, R2, R3 are CRSs of antenna ports 0, 1, 2, and 3, respectively.

<Embodiment for Transmitting Reference Signal (RS) to RN

Figure 8:
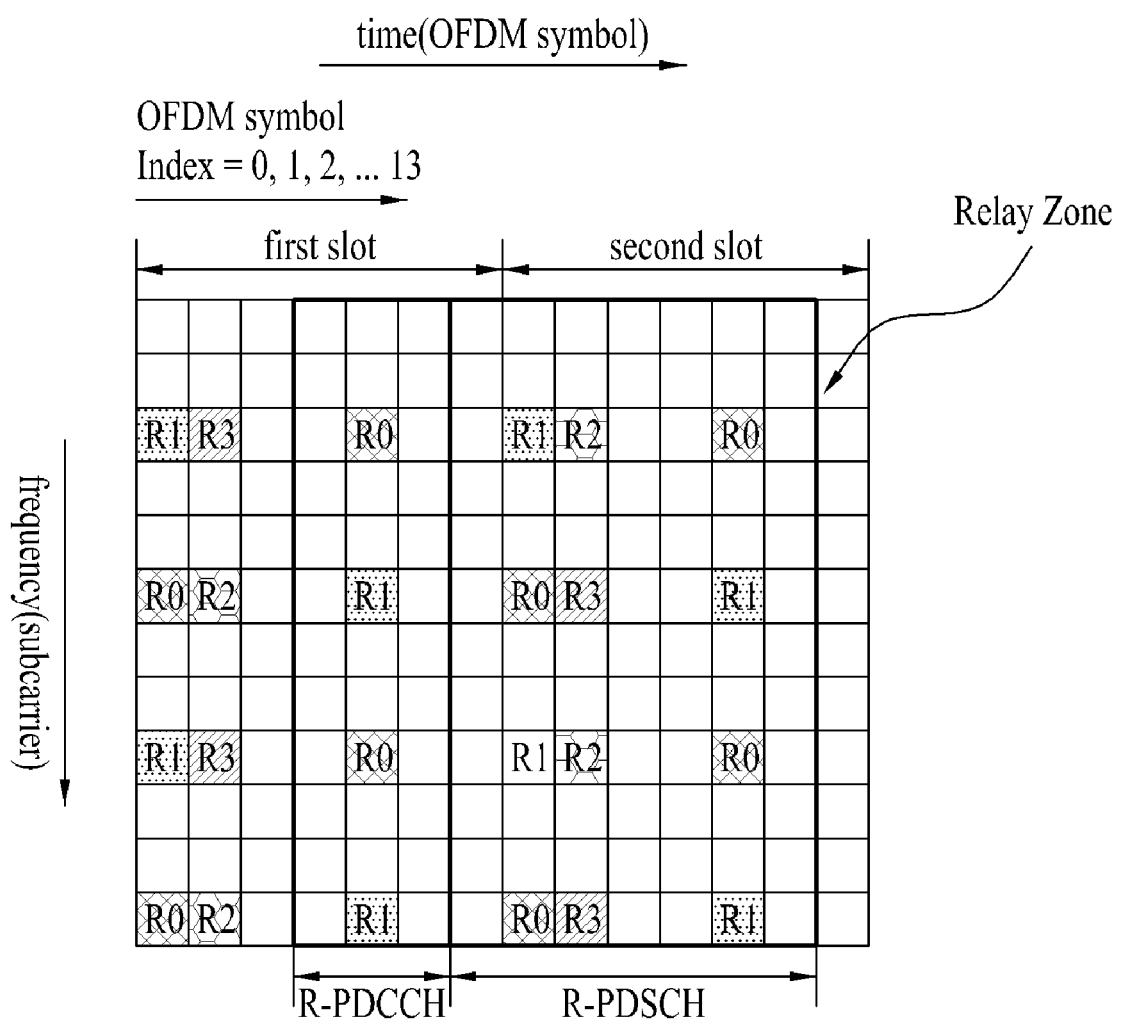
FIG. 8 exemplarily shows a PRB structure including not only a CRS pattern of a 3GPP LTE system acting as an exemplary mobile communication system but also a CSI-RS pattern for a relay node (RN)

FIG. 8 exemplarily shows a PRB structure including not only a CRS pattern of a 3GPP LTE system acting as an exemplary mobile communication system but also a CSI-RS pattern for a relay node (RN).

In the LTE system, the eNB may transmit the CSI_RS to the Rn through a predetermined downlink backhaul subframe. The RN may perform channel measurement and demodulation using the CSI-RS. In this case, the eNB may assign the CSI-RS to the R-PDCCH zone. In other words, the eNB transmits the CSi-RS to the RN through the R-PDCCH zone, resulting in an increased decoding performance of a control channel.

Referring to FIG. 8, provided that the eNB transmits a R-PDCCH through N initial OFDM symbols of the relay zone, the R-PDCCH can be transmitted to the RN through a first OFDM symbol (i.e., an OFDM symbol having an index of 3, referred to as a OFDM symbol index 3) depending on the time order of the relay zone. In more detail, the first OFDM symbol is a fourth OFDM symbol from among 14 OFDM symbols from the OFDM symbol index 0 to the OFDM symbol index 13 of the OFDM symbol of the eNB downlink backhaul subframe. In this case, the eNB may also transmit the R-PDCCH through the first OFDM symbol of the relay zone and a third OFDM symbol (i.e., a OFDM symbol index 5). In other words, the eNB may transmit the R-PDCCH to the RN through the OFDM symbol index 3 and the OFDM symbol index 5 from among 14 OFDM symbols from the OFDM symbol index 0 to the OFDM symbol index 13 of the OFDM symbol of the eNB downlink backhaul subframe.

In contrast, the eNB may allocate the CSI-RS to the R-PDCCH zone. In other words, the eNB may allocate the CSI-RS to the R-PDSCH zone so as to increase a decoding performance of a data channel.

Figure 9:
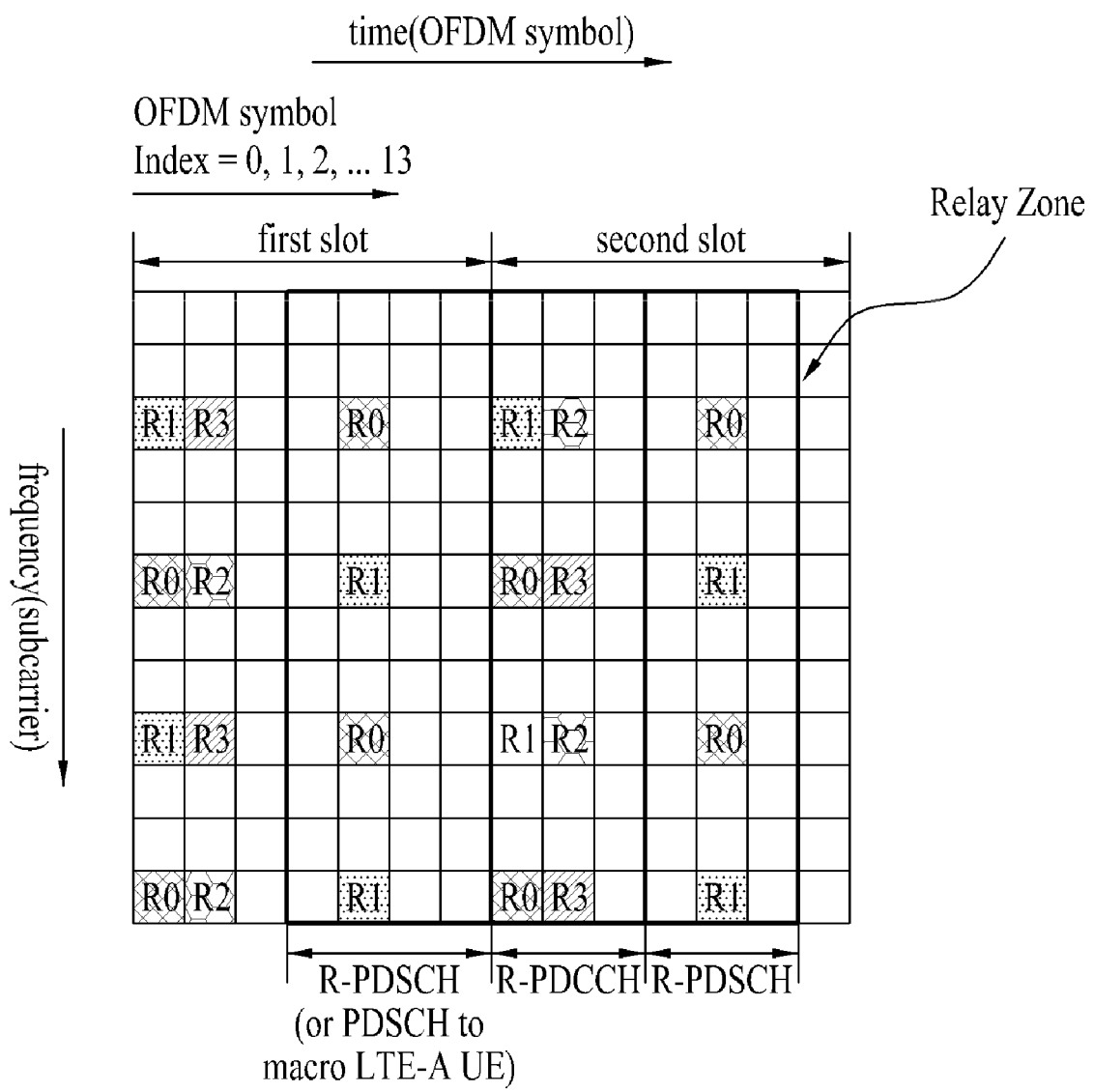
FIG. 9 exemplarily shows a PRB structure including not only a CRS pattern of a 3GPP LTE system acting as an exemplary mobile communication system but also a CSI-RS pattern for a relay node (RN)

FIG. 9 exemplarily shows a PRB structure including not only a CRS pattern of a 3GPP LTE system acting as an exemplary mobile communication system but also a CSI-RS pattern for the RN.

Referring to FIG. 9, the eNB may assign the CSI-RS to the R-PDCCH zone. That is, the eNB transmits the CSI-RS to the RN through the R-PDCCH region, resulting in an increased decoding performance of a control channel. In the case where the eNB allocates the R-PDCCH to N initial OFDM symbols of a second slot of the relay zone transmits the resultant R-PDCCH, the R-PDCCH may be transmitted to the RN through the last OFDM symbol (i.e., OFDM symbol index 6) of the first slot. The OFDM symbol index 6 which is the last OFDM symbol is a $7^{th}$ OFDM symbol from among 14 OFDM symbols from the OFDM symbol index 0 to the OFDM symbol index 0 of the OFDM symbol of the eNB downlink backhaul subframe.

In contrast, provided that the eNB transmits the R-PDCCH to N initial OFDM symbols of the second slot, the R-PDCCH may be transmitted to the RN through a third OFDM symbol (i.e., OFDM symbol index 10) of the second slot. The OFDM symbol index 10 which is the third OFDM symbol in the second slot is a $11^{th}$ OFDM symbol from the OFDM symbol index 0 to the OFDM symbol index 13 of the OFDM symbol of the eNB downlink backhaul subframe.

In the meantime, provided that the eNB transmits the R-PDCCH to N initial OFDM symbols of the second slot, the R-PDCCH may be transmitted to the RN through the last OFDM symbol of the first slot and the third OFDM symbol of the second slot. In other words, the R-PDCCH may be transmitted to the RN through a $7^{th}$ OFDM symbol (OFDM symbol index 6) and a $11^{th}$ OFDM symbol (OFDM symbol index 10) among 14 OFDM symbols of OFDM symbol index 0 to 13 in the eNB downlink backhaul subframe.

Referring to FIG. 9, provided that the R-PCCH is transmitted through N initial OFDM symbols of the second slot, the eNB may use a first slot to transmit a PDSCH of an LTE-A UE for a macro cell or to transmit a R-PDSCH for the RN.

In this case, a size of the OFDM symbol (N OFDM symbol) used for R-PDCCH transmission may be semi-statically assigned. The eNB may signal the N value to the RN through higher layer signaling or a broadcast channel. In contrast, the N OFDM symbol used for R-PDCCH transmission may be dynamically changed per backhaul subframe. In this case, a relay-physical control format indicator channel (R-PCFICH) is assigned to the R-PDCCH zone, such that the eNN may signal the N value to the RN through the R-PCFICH.

The position of a control channel for the RN may be located at the fifth OFDM symbol (i.e., OFDM symbol index 4) shown in FIG. 8. In this case, the control channel can be decoded using the legacy CRS (R0 and R1) without using the CSI-RS. Although R0 and R1 can be used irrespective of the location of a control channel for the RN, if the control channel for the RN is shifted to the fifth OFDM symbol, the fourth OFDM symbol may be used as a PDSCH for the RN, a PDSCH for LTE-A, or other control channels.

If the RN uses the CSI-RS for demodulation, this CSI-RS and the legacy CRS may be used interchangeably. That is, R0 and R1 present at the fifth OFDM symbol are used as two antenna ports, and the remaining necessary antnea ports may be extracted from CSI-R. In contrast, as shown in FIG. 9, if a control channel is present in the first part of the second slot, a method for reusing CRS ports R0 to R3 may be used. In this case, the remaining necessary channels may be extracted from the CSI-RS.

A MIMO mode contained in a control channel for the RN may include a spatial multiplexing mode and a diversity mode. In this case, the number of necessary antenna ports may be limited to 2 or 4. In this case, the number of types of necessary reference symbols (reference signals) is limited to 2 or 4. Such limitation may be implemented only using the CRS. In other words, as a method for decoding control information for the RN, a method for defining the spatial multiplexing mode or diversity mode without using the CSI-RS and DRS may be used. Here, the CSI-RS position may be located at an arbitrary position irrespective of the RN control channel.

The RN control channel may define a MIMO mode according to new antenna port definition based on an arbitrary combination of the CSI-RS. In other words, CSI-RS for all the antennas is defined as Rank 1, precoding may be applied to the control channel such that the precoded result can be transmitted. If the diversity mode is defined, a control channel is divided into arbitrary groups, precoding is applied to individual groups, such that the precoded result can be transmitted. If the spatial multiplexing mode is defined, precoding may be applied to each grouped antenna and at the same time a spatial stream for each antenna group may be defined. In this case, the legacy CRS instead of the used CSI-RS may be used as necessary.

Figure 10:
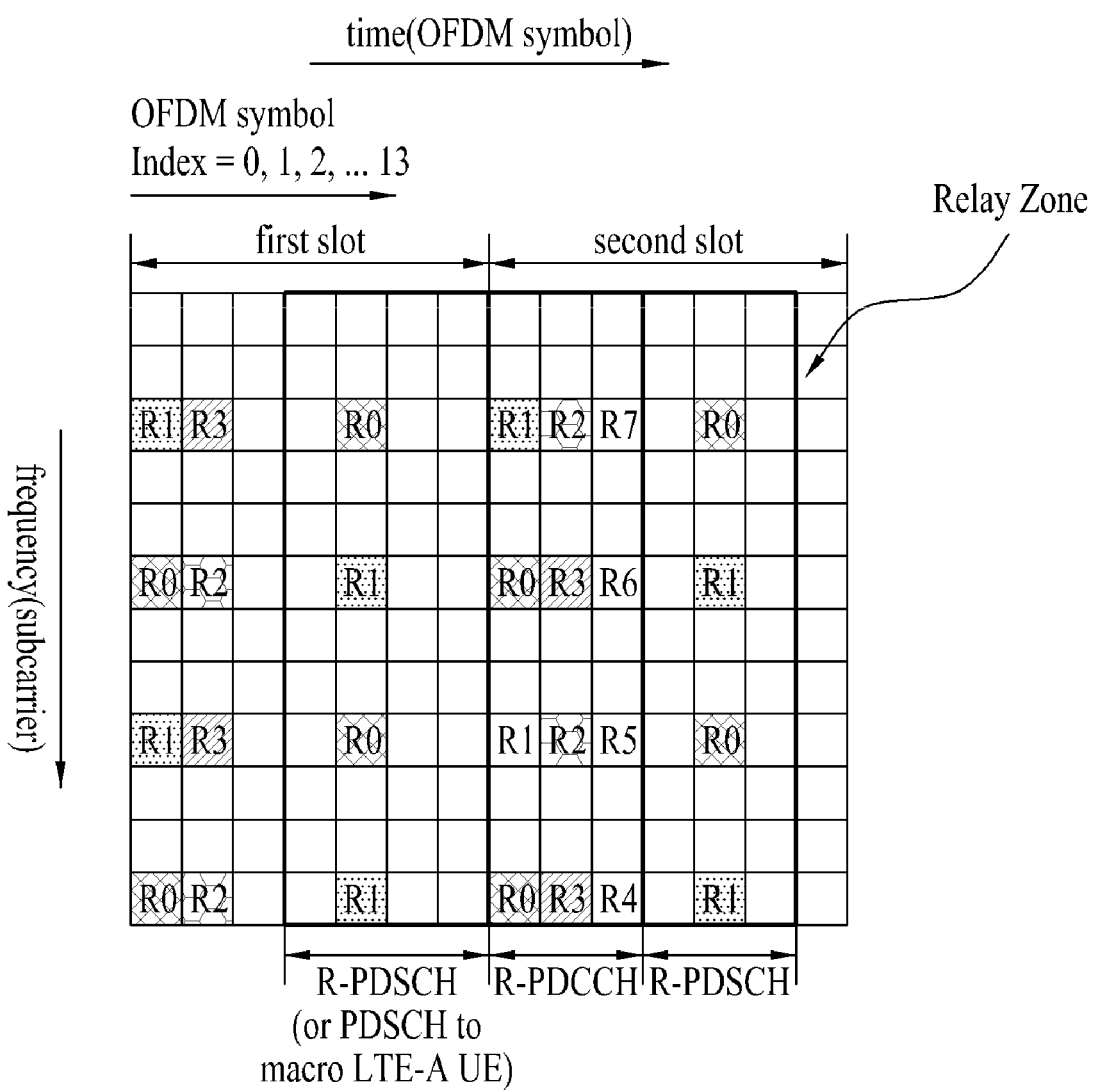
FIGS. 10 and 11 exemplarily show a PRB structure including not only a CRS pattern of a 3GPP LTE system acting as an exemplary mobile communication system but also a DM-RS pattern for a relay node (RN)
Figure 11:
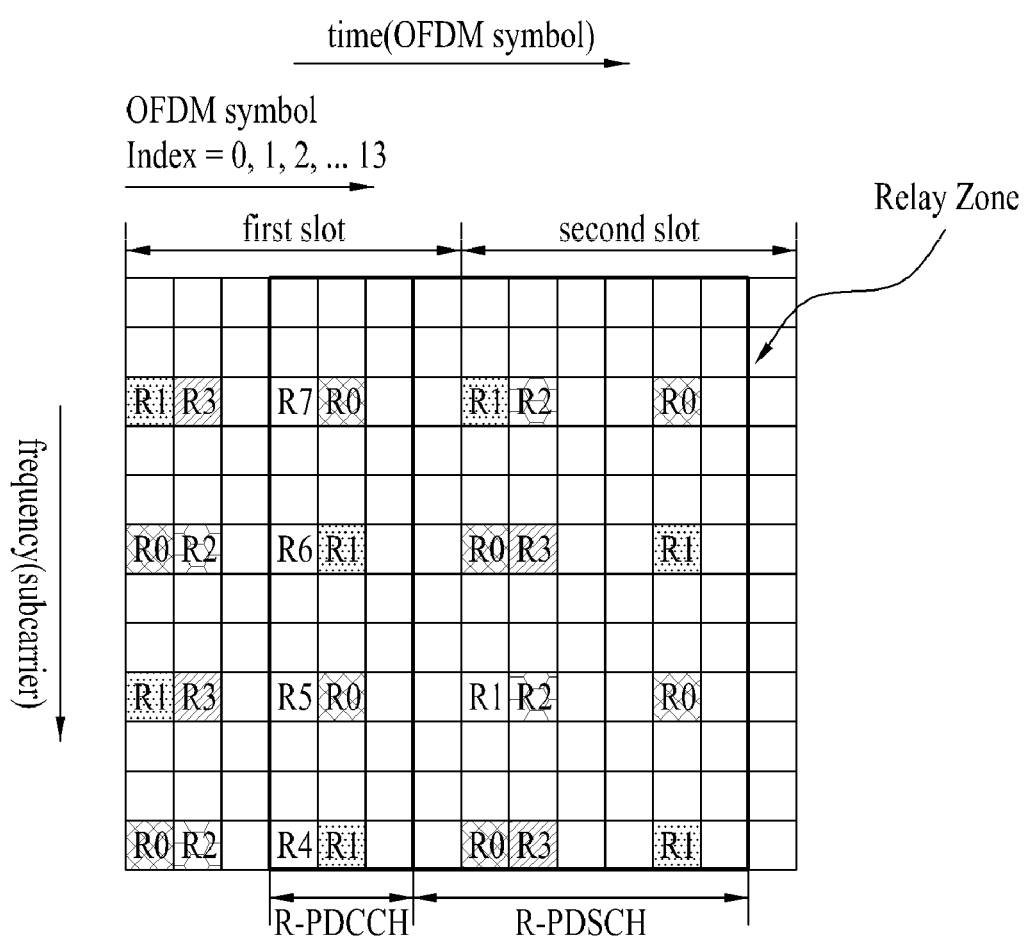

FIGS. 10 and 11 exemplarily show a PRB structure including not only a CRS pattern of a 3GPP LTE system acting as an exemplary mobile communication system but also a DM-RS pattern for a relay node (RN).

A dedicated reference signal (DRS) acting as a demodulation reference signal for RNs in a relay zone of a backhaul subframe is defined, and the RN performs channel measurement and demodulation using the defined DRS. The OFDM symbol position at which the DRS is assigned and transmitted may be identical to an OFDM symbol position at which the CSI-RS is assigned and transmitted. For example, as can be seen from FIGS. 10 and 11, DRS may be assigned to the OFDM symbol having an index of 3 or 9.

Figure 12:
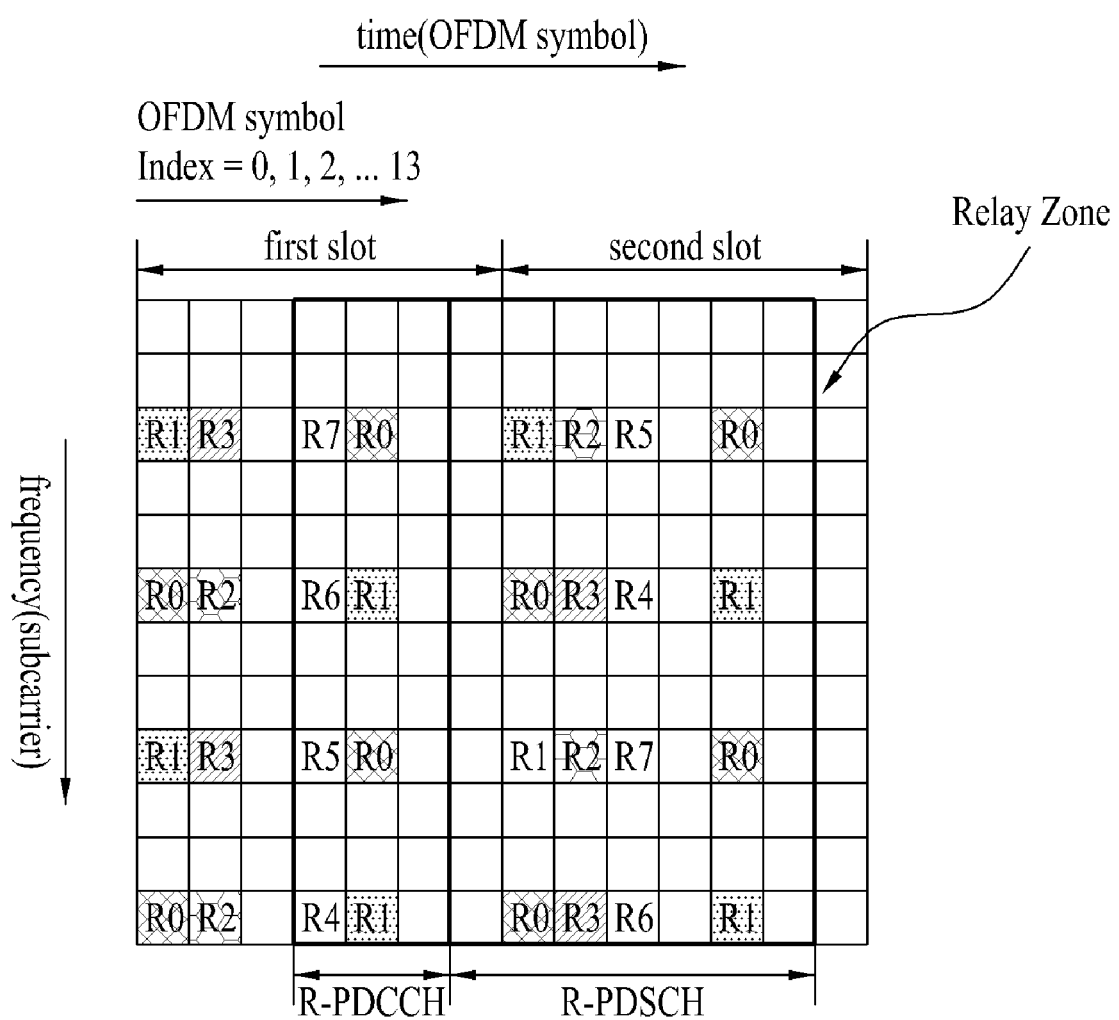
FIG. 12 shows an example of a PRB structure including not only a CRS pattern of a 3GPP LTE system acting as an exemplary mobile communication system but also a DM-RS pattern for a relay node (RN)

FIG. 12 shows an example of a PRB structure including not only a CRS pattern of a 3GPP LTE system acting as an exemplary mobile communication system but also a DM-RS pattern for a relay node (RN).

Referring to FIG. 12, RSs corresponding to antenna ports 4 to 8 may be transmitted through one or more OFDM symbols from among OFDM symbol indexes 3, 5, 6, 9, 10 and 12 at the same frequency position as those of FIGS. 10 and 11 (i.e., the frequency position corresponding to a subcarrier index at which DRS is assigned in FIGS. 10 and 11). If DRS for the RN is transmitted through a plurality of OFDM symbols, frequency hopping of an RS corresponding to a port in response to an OFDM symbol may be achieved as shown in FIG. 12.

If DRS is applied to control channel demodulation, precoding may be applied to DRS. In this case, different precoding methods may be applied to a DRS of a control channel region and a DRS of a data region. However, from the standpoint of channel estimation facility and RS design, the control channel DRS is identical to the data channel DRS, and precoding may be applied to each DRS or a MIMO mode may be defined such that the resultant data may be transmitted. In this case, there is a need for the order of channel estimation requisite for the control channel to be identical to a data estimation order of the data channel. That is, although the diversity mode is applied to the control channel and the spatial multiplexing mode is applied to the data channel, there is a need for the number of channel estimation times requisite for the control channel region to be identical to that of the data region.

A unit for generating a control channel for the RN may be identical to a data allocation unit. In other words, provided that the number of RBs used in the control channel is set to A, the number of RBs of the data channel indicated by the corresponding control channel must be set to A or higher. By such allocation, a DRS of the control channel and a DRS of the data channel can be equally precoded. In association with a specific part at which no control channel is allocated, DRS may be precoded in the same manner as in precoding of a data channel allocated to a specific RN.

For the control channel for the RN, a new control channel dedicated RS may be defined as necessary. In case of a DRS for the data channel, if either the number of DRS allocations or density is insufficient, it is expected that performance is deteriorated due to the control channel. In order to obviate the performance deterioration, a separate RS may be defined in an assignment region of the RN control channel. In case of the RN control channel, the amount of used resources may be limited, such that the remaining region may be used as an RS for the control channel and the RS may be defined as a 1Tx, 2Tx, 4Tx, or 8Tx structure in response to a transmission mode used in the control channel. In addition, the remaining region obtained after the control channel and RS are used may be still utilized as data for the RN. In this case, although demodulation of the data part may be used as an RS for the control channel, it should be noted that the data part demodulation may be achieved on the basis of the DRS for the RN data region.

As another embodiment for enabling the eNB to transmit an RS to the RN, there may be used a method for allocating the CSI-RS in the LTE-A system and allocating a DRS in a relay zone in such a manner that the RN can perform channel estimation and demodulation using two RSs.

A R-PDCCH format for the RN will hereinafter be described in detail. The eNB may transmit scheduling allocation information, other control information, etc. to the Rn over the R-PDCCH. A physical control channel transmitted from the eNB to the RN may be transmitted through one aggregation or plurality of contiguous control channel elements (CCEs). In this case, one CCE may include 9 resource element (RE) groups.

In the R-PDCCH format acting as the RN control. channel, Quadrature Phase Shift Keying (QPSK) or 16 Quadrature Amplitude Modulation (QAM), 64QAM, etc. may be used as a modulation scheme. The size of resource element modulation (REG) may correspond to four contiguous REs that are not used as RS, R-PCFICH (Relay-Physical Control Format Indicator Channel), and R-PHICH (Relay-Physical HARQ Indicator Channel). The size of 9 REG CCEs may be maintained irrespective of the modulation scheme. The number of R-PDCCH bits may be determined according to a modulation scheme and a CCE aggregation level.

For example, in case of R-PDCCH format 0, CCE aggregation level is set to 1 and the number of R-PDCCH bits may be determined according to each modulation scheme. In case of the QPSK, information of 72 bits may be assigned to R-PDCCH format 0, information of 144 bits may be assigned to 16QAM, and information of 216 bits may be assigned to 64QAM.

The R-PDCCH format according to the CCE aggregation level may have the same structure as that of the PDCCH format of the LTE system. In other words, aggregation levels 1, 2, 4 and 8 may be maintained irrespective of the modulation scheme. The R-PDCCH format may support an aggregation level of 8 or higher as necessary. In this case, a search space of the RN may also be decided, in response to the supported aggregation level. For example, the search space of the RN may support aggregation levels 16, 32, . . . .

Irrespective of the modulation scheme, the number of R-PDCCH bits corresponding to one CCE may be maintained (for example, 1 CCE=72 bits). In this case, the CCE size depending on one modulation scheme can be determined as follows. For example, the QPSK scheme may have the size of 9 REG CCEs, the 16QAM may have the size of 4.5 REG CCEs, and the 64QAM may have the size of 3 REG CCEs. Irrespective of the modulation scheme, the CCE aggregation level constructing one R-PDCCH may be maintained at 1, 2, 4, and 8 as in the ITE system. Irrespective of the modulation scheme, the CCE aggregation level constructing one R-PDCCH may be set to 1, 2, 4 and 8 or new aggregation levels of 16, 32, 64, . . . may be applied as necessary.

The same modulation scheme may be applied to R-PDCCHs of a predetermined backhaul subframe.

The R-PDCCH modulation scheme may be semi-statically determined. In this case, the R-PDCCH modulation scheme may be transmitted to each RN through higher layer signaling. Alternatively, the eNB may dynamically change the R-PDCCH modulation scheme at every subframe, such that the changed information may be used as broadcast information for each RN. In another example, the eNB may explicitly inform the RN of the R-PDCCH modulation scheme over the R-PCFICH, and the eNB may implicitly indicate the R-PDCCH modulation scheme. For example, the same modulation scheme as that of the R-PCFICH may also be applied to the R-PDCCH.

In a predetermined backhaul subframe, different modulation schemes may be applied to individual R-PDCCHs. In this case, the RN may be configured to perform blind search in response to all modulation schemes.

The mapping of R-PDCCH to CCE RE may be carried out in the same manner as in the mapping scheme of the LTE system. In order to implement R-PDCCH transmission when data is assigned to a cell-specific relay zone, a transmission diversity (TxD) scheme depending on the antenna structure may be used. In the case where data is assigned to the RN-specific relay zone, the transmission diversity scheme or the precoded beamforming may be used to implement R-PDCCH transmission.

Figure 13:
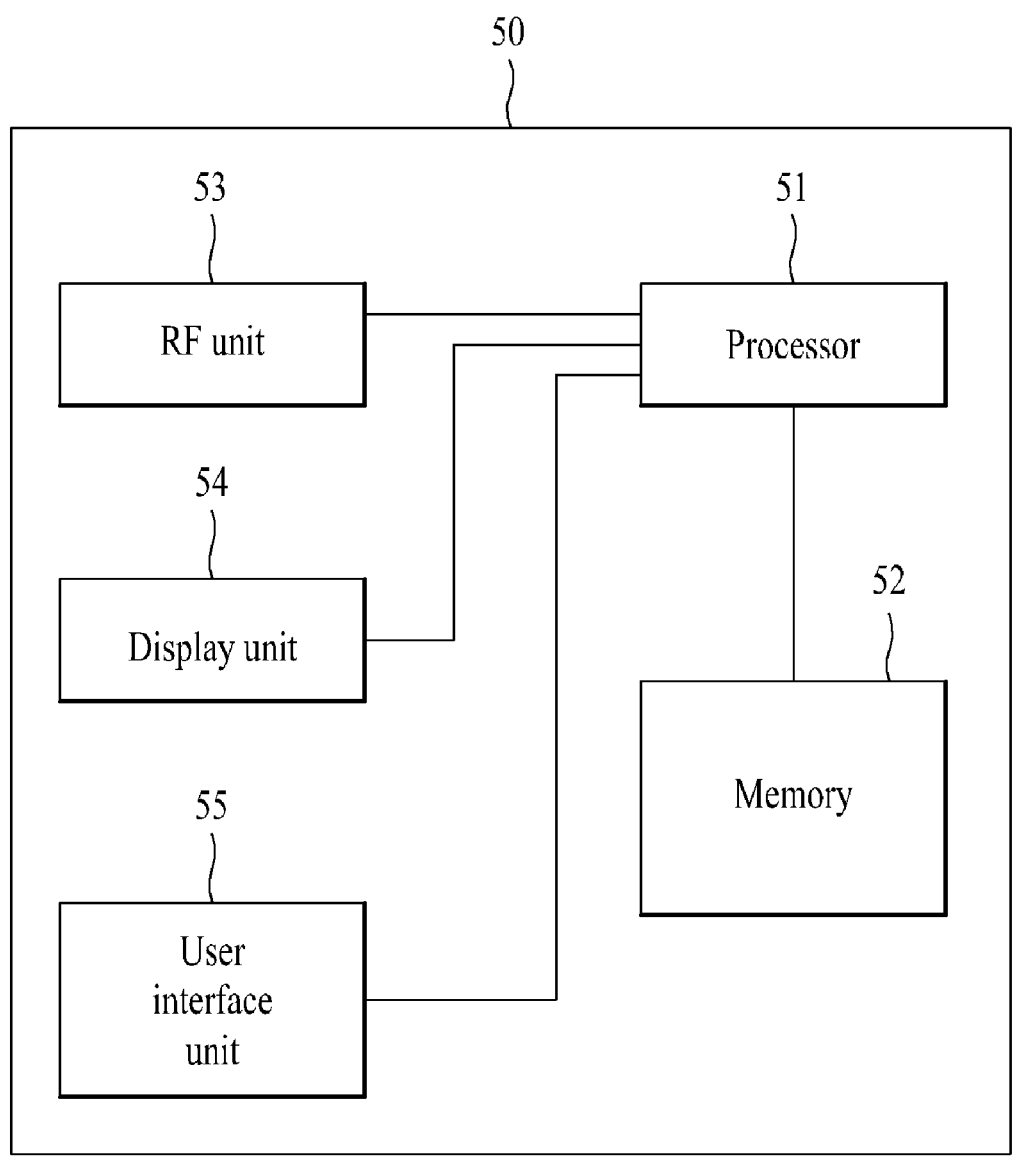
FIG. 13 is a diagram illustrating constituent elements of an apparatus according to an embodiment of the present invention.

FIG. 13 is a diagram illustrating constituent elements of a device 50, which is applicable to a user equipment (UE) or an eNode B and is able to implement embodiments of the present invention.

Referring to FIG. 13, a device 50 may be a user equipment (UE) or an eNode B (eNB). The device 50 includes a processor 51, a memory 52, a Radio Frequency (RF) unit 53, a display unit 54, and a user interface unit 55.

Layers of the radio interface protocol are implemented in the processor 51. The processor 51 provides a control plane and a user plane. The processor 51 may perform functions of each layer. The memory 52, which is electrically connected to the processor 51, stores an operating system, application programs, and general files.

The display unit 54 may display various pieces of information and be configured with a Liquid Crystal Display (LCD), an Organic Light Emitting Diode (OLED), etc. which are known in the art.

The user interface unit 55 may be configured to be combined with a known user interface such as a keypad, a touch screen, or the like.

The RF unit 53, which is electrically connected to the processor 51, transmits and receives RF signals. The RF unit may be classified into a processor transmission (Tx) module (not shown) and a processor reception (Rx) module (not shown).

Radio interface protocol layers between the UE and a network can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE and the network may exchange RRC messages with each other through the RRC layer.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations as described above. Software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

A method for receiving a signal at the RN according to embodiments of the present invention can be applied to various mobile communication systems, for example, 3GPP LTE system, LTE-A, and other systems.

The invention claimed is:

1. A method for receiving a signal by a relay node in a wireless communication system, the method comprising:
   receiving information regarding a start point of a relay-physical downlink control channel (R-PDCCH) at a specific downlink subframe configured for an eNode B-to-the relay node transmission, wherein the start point of the R-PDCCH is a fourth orthogonal frequency divisional multiplexing (OFDM) symbol in the specific downlink subframe;
   receiving the R-PDCCH during the fourth OFDM symbol to a sixth OFDM symbol of the specific downlink subframe based on the information regarding the start point of the R-PDCCH;
   demodulating the R-PDCCH based upon a reference signal for demodulation transmitted on an antenna port 7; and
   receiving a data channel for the relay node based upon the R-PDCCH,
   wherein the reference signal is mapped to a resource element in a first slot of the specific downlink subframe when a last symbol of the data channel is a sixth OFDM symbol of the second slot of the specific downlink subframe.

2. The method according to claim 1, wherein the information regarding the start point of the R-PDCCH is received through a higher layer signaling from the eNode B.

3. A relay node for receiving a signal in a wireless communication system, the relay node comprising:
a radio frequency (RF) unit that:
receives information regarding a start point of a relay-physical downlink control channel (R-PDCCH) at a specific downlink subframe configured for an eNode B-to-the relay node transmission, wherein the start point of the R-PDCCH is a fourth orthogonal frequency divisional multiplexing (OFDM) symbol in the specific downlink subframe, and
receives the R-PDCCH during the fourth OFDM symbol to a sixth OFDM symbol of the specific downlink subframe based on the information regarding the start point of the R-PDCCH, and
a processor that demodulates the R-PDCCH based upon a reference signal for demodulation transmitted on an antenna port 7, and
wherein the radio frequency (RF) unit receives a data channel for the relay node based upon the R-PDCCH,
wherein the reference signal is mapped to a resource element in a first slot of the specific downlink subframe when a last symbol of the data channel is a sixth OFDM symbol of the second slot of the specific downlink subframe.

4. The relay node according to claim 3, wherein the information regarding the start point of the R-PDCCH is received through a higher layer signaling from the eNode B.

5. A method for transmitting a signal by an eNode B in a wireless communication system, the method comprising:
configuring a start point of a relay-physical downlink control channel (R-PDCCH) at a specific downlink subframe configured for the eNode B-to-a relay node transmission;
transmitting information regarding the start point of the R-PDCCH, wherein the start point of the R-PDCCH is a fourth orthogonal frequency divisional multiplexing (OFDM) symbol in the specific downlink subframe;
modulating the R-PDCCH based upon a reference signal for demodulation to be transmitted on an antenna port 7;
transmitting the R-PDCCH during the fourth OFDM symbol to a sixth OFDM symbol of the specific downlink subframe based on the information regarding the start point of the R-PDCCH; and
transmitting a data channel for the relay node based upon the R-PDCCH,
wherein the reference signal is mapped to a resource element in a first slot of the specific downlink subframe when a last symbol of the data channel is a sixth OFDM symbol of the second slot of the specific downlink subframe.

6. An eNode B for transmitting a signal in a wireless communication system, the eNode B comprising:
a processor that configures a start point of a relay-physical downlink control channel (R-PDCCH) at a specific downlink subframe configured for the eNode B-to-a relay node transmission; and
a radio frequency (RF) unit that transmits information regarding the start point of the R-PDCCH, wherein the start point of the R-PDCCH is a fourth orthogonal frequency divisional multiplexing (OFDM) symbol in the specific downlink subframe;
wherein the processor modulates the R-PDCCH based upon a reference signal for demodulation to be transmitted on an antenna port 7, and
wherein the radio frequency (RF) unit:
transmits R-PDCCH during the fourth OFDM symbol to a sixth OFDM symbol of the specific downlink subframe based on the information regarding the start point of the R-PDCCH, and
transmits a data channel for the relay node based upon the R-PDCCH,
wherein the reference signal is mapped to a resource element in a first slot of the specific downlink subframe when a last symbol of the data channel is a sixth OFDM symbol of the second slot of the specific downlink subframe.

* * * * *